(12) United States Patent
Fan et al.

(10) Patent No.: US 7,848,102 B2
(45) Date of Patent: Dec. 7, 2010

(54) ELECTRONIC DEVICE

(75) Inventors: Chen-Lu Fan, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 157 days.

(21) Appl. No.: 12/337,754

(22) Filed: Dec. 18, 2008

(65) Prior Publication Data
US 2010/0008051 A1   Jan. 14, 2010

(30) Foreign Application Priority Data
Jul. 8, 2008   (CN) .................. 2008 2 0301484

(51) Int. Cl.
*H05K 5/00* (2006.01)
*H05K 7/00* (2006.01)

(52) U.S. Cl. .................. 361/679.58; 361/679.37; 361/679.02

(58) Field of Classification Search ............ 361/679.58, 361/679.37, 679.02
See application file for complete search history.

(56) References Cited

U.S. PATENT DOCUMENTS 7,068,907 B2 *   6/2006   Schray ................. 385/135
2005/0213290 A1 *   9/2005   Lauffer et al. ............... 361/681

* cited by examiner

*Primary Examiner*—Jayprakash N Gandhi
*Assistant Examiner*—Anthony M Haughton
(74) *Attorney, Agent, or Firm*—Clifford O. Chi

(57) ABSTRACT

An electronic device includes a chassis, a tray, and a securing member. The chassis is configured to hold electronic elements having cables, and includes a rear plate having an outer surface. The tray is attachable to the outer surface of the rear plate, and includes a bottom wall substantially perpendicular to the rear plate of the chassis. The securing member secured on the bottom wall of the tray and includes a latch portion resiliently deformable for maintaining the cables between the latch portion and the bottom wall.

14 Claims, 4 Drawing Sheets

ELECTRONIC DEVICE

BACKGROUND

1. Technical Field

The present disclosure relates to an electronic device with cables.

2. Description of the Related Art

A typical personal computer system or server includes a chassis for securing electronic elements, such as a motherboard, hard disk drives, and so on. The electronic elements may be connected to other electronic elements via cables. If the cables are not arranged or maintained in an orderly manner, it becomes inconvenient to maintain or replace the electronic elements secured in the chassis.

DETAILED DESCRIPTION OF THE EMBODIMENTS

Figure 1:
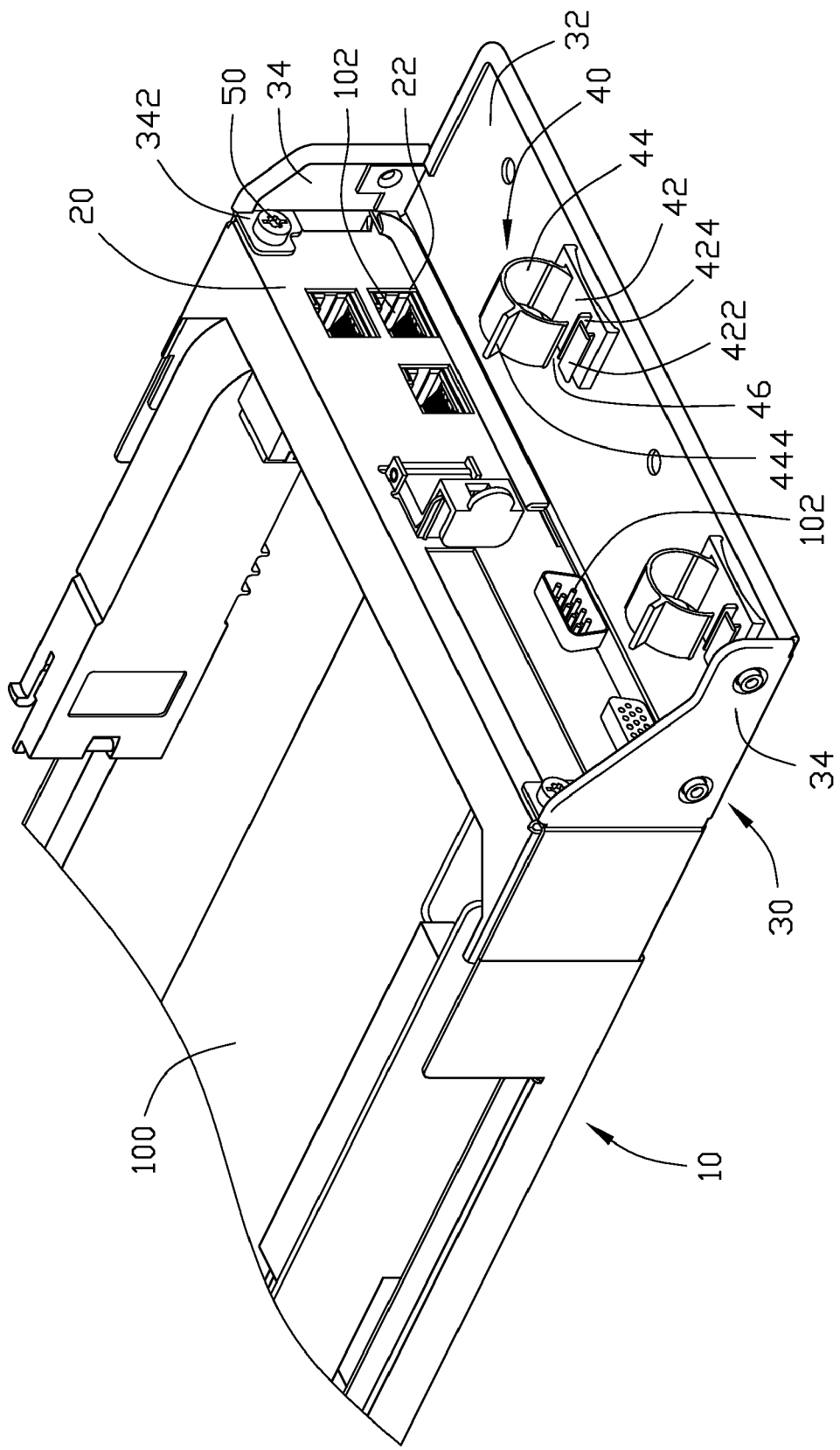
FIG. 1 is a partial, assembled, isometric view of an embodiment of an electronic device, the electronic device including a chassis, a tray, and a plurality of securing member.

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Referring to FIG. 1, an embodiment of an electronic device includes a chassis 10 for securing electronic elements 100, a tray 30 attached to the chassis 10, and a plurality of securing members 20 secured on the tray 30. The electronic elements 100 may be a motherboard, expansion cards, and so on, and have a plurality of connectors 102.

The chassis 10 includes a rear plate 20 with an outer surface. The rear plate 20 defines a plurality of through holes 22 corresponding to the connectors 102 of the electronic elements 100, and two mounting holes (not shown) at opposite top corners of the rear plate 20.

Figure 2:
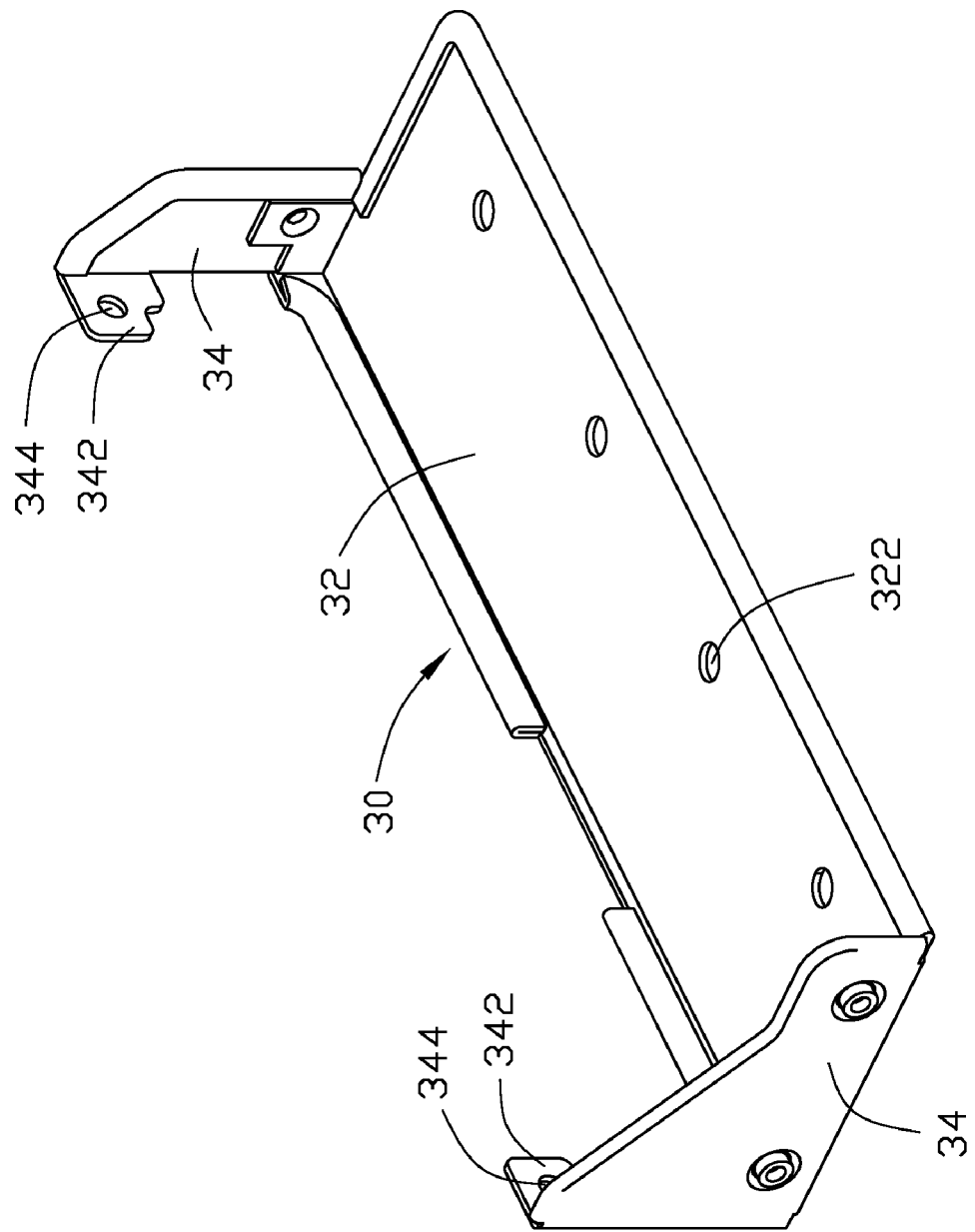
FIG. 2 is another isometric view of the tray of FIG. 1.

Referring also to FIG. 2, the tray 30 includes a bottom wall 32 and two parallel sidewalls 34 extending substantially perpendicularly from the bottom wall 32. The bottom wall 32 defines a plurality of securing holes 322. Two pieces 342 are substantially perpendicularly bent from the sidewalls 34, and extend toward each other. A mounting hole 344 is defined in each piece 342.

Figure 3:
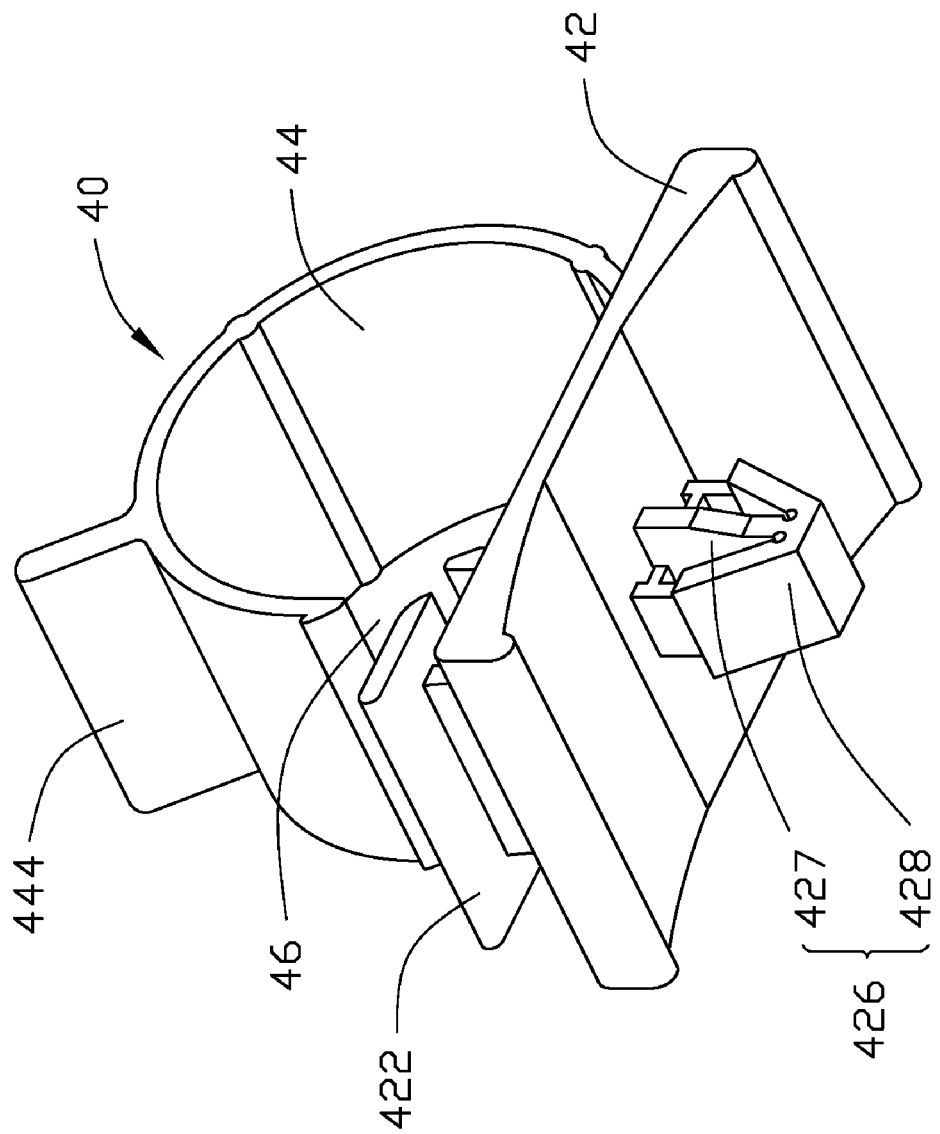
FIG. 3 is another isometric view of the securing member of FIG. 1.
Figure 4:
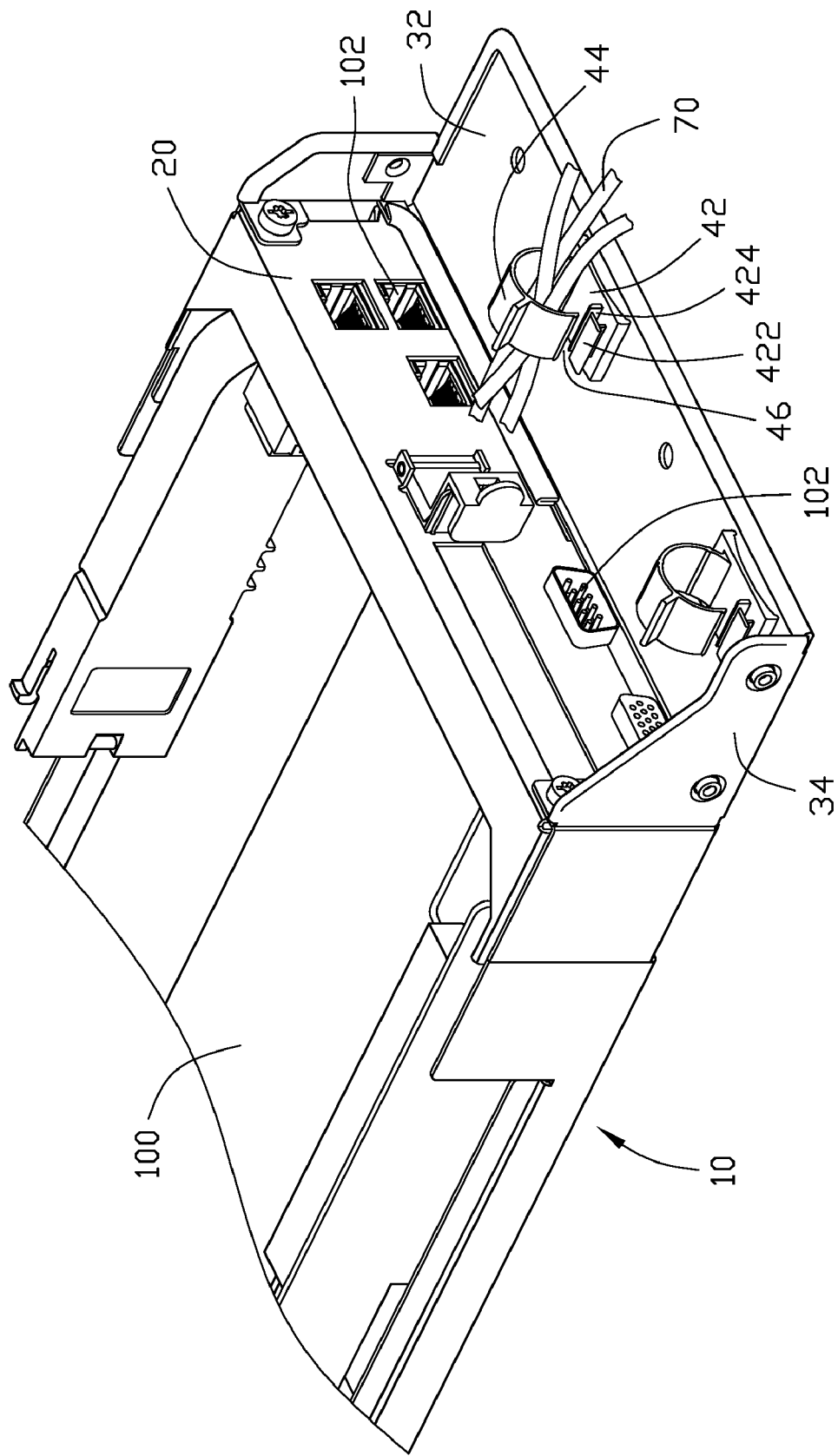
FIG. 4 is similar to FIG. 1, but showing cables arranged in one of the securing members.

Referring also to FIG. 3, each of the securing members 40 includes a base portion 42 and a resilient arc-shaped latch portion 44 protruding from a top surface of the base portion 42. An access 46 is formed between a free end of the latch portion 44 and the base portion 42. A T-shaped block 422 and a substantially rectangular tab 424 adjacent to the T-shaped block 422 protrude from the base portion 42 adjacent to the access 46. A height of the T-shaped block 422 is greater than that of the rectangular tab 424. A locking block 426 protrudes from a bottom surface of the base portion 42, corresponding to the securing hole 322 of the tray 30. The locking block 426 includes a mounting portion 427 extending from the base portion 42 and a resilient portion 428 extending from a free end of the mounting portion 427 toward the base portion 42. The resilient portion 428 can be pressed to deform toward the mounting portion 427, and rebound away from the mounting portion 427 when released. An operating tab 444 is formed on the latch portion 44 to deform the latch portion 44.

Referring to FIGS. 1-4, the tray 30 is attached on the outer surface of the rear plate 20 of the chassis 10. Two fasteners 50, such as screws, are screwed into the mounting holes 344 of the pieces 342 of the tray 30 and the corresponding mounting holes of the rear plate 20, thereby fixing the tray 30 on the outer surface of the rear plate 20. The resilient portion 428 of the locking block 426 of the securing member 42 is deformed by edges of the corresponding securing hole 322 of the tray 30, when the locking block 426 is inserted into the corresponding securing hole 322 of the tray 30. When the resilient portion 428 passes through the securing hole 322, the resilient portion 428 rebounds to an original state and thereby abuts against a bottom surface of the bottom wall 32 of the tray 30. The bottom wall 32 is sandwiched between the base portion 42 and the resilient portion 428 of the locking block 426, and the securing member 40 is removably secured on a top surface of the bottom wall 32 of the tray 30.

Referring also to FIG. 3, the cables 70 is placed on the T-shaped block 422. The operating tab 444 deforms the latch portion 44, and widens the access 46 until the cables 70 are inserted through the access 46. Since the height of the T-shaped block 422 is greater than that of the rectangular tab 424, the cables 70 can conveniently pass across the substantially rectangular tab 424 to insert through the access 46, and be positioned between the latch portion 44 and the base portion 42 of the securing member 40. The operating tab 444 is released and the resilient portion 44 rebounds to an original state. The cables 70 are blocked by the substantially rectangular tab 424 from accidentally escaping from the corresponding securing member 40 via the access 46 and maintained between the latch portion 44 and the base portion 42. Thus, the cables 70 can be held and maintained in an orderly fashion in the chassis 10.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
    a chassis configured to hold electronic elements having cables, the chassis comprising a rear plate having an outer surface;
    a tray attachable to the outer surface of the rear plate, the tray comprising a bottom wall substantially perpendicular to the rear plate of the chassis; and
    a securing member comprising a base portion secured to the bottom wall of the tray and substantially parallel to the bottom wall, a latch portion disposed on an upper surface of base portion, and a locking block disposed on bottom surface of the base portion, an access formed between a free end of the latch portion and the base portion, and the latch portion resiliently deformable for maintaining the cables between the latch portion and the bottom wall of the tray.

2. The electronic device of claim 1, wherein the bottom wall of the tray defines a securing hole therein; a locking block is formed on the base portion of the securing member, and configured to engage in the securing hole of the bottom wall of the tray.

3. The electronic device of claim 2, wherein the locking block of the securing member comprises a mounting portion protruding from the base portion, and a resilient portion extending from the mounting portion; the resilient portion deforms to insert into the securing hole of the tray, and rebounds to removably fix the locking block to the securing hole after inserting through the securing hole.

4. The electronic device of claim 1, wherein the latch portion of the securing member is arc-shaped.

5. The electronic device of claim 1, wherein an operating tab is formed on the latch portion of the securing member, and is configured to deform the latch portion, and a distance is formed between the operating tab and an free end of the latch portion.

6. The electronic device of claim 1, wherein a tab is formed on the base portion of the securing member adjacent to the access to maintain the cables between the latch portion and the base portion and preventing removal from the securing member via the access.

7. The electronic device of claim 1, wherein a T-shaped blocked is formed on the base portion of the securing member adjacent to the access and configured to conveniently allow the cables to insert through the access of the securing member.

8. An electronic device, comprising:
a chassis configured to hold electronic elements having cables;
a tray attached to the chassis, the tray defining a securing hole therein; and
a securing member configured to arrange the cables, the securing member comprising a base portion, a latch portion disposed on the base portion, an access formed between a free end of the latch portion and the base portion, and a tab and a block formed on the base portion, the block having a height greater than that of the tab, and the tab and the block are adjacent to the access, wherein the tab and the block are capable of making the cables conveniently pass through the access, to position between the latch portion and the base portion.

9. The electronic device of claim 8, wherein a latch portion protruding from the base portion; the latch portion is resiliently deformable for maintaining the cables between the latch portion and the base portion.

10. The electronic device of claim 9, wherein the locking block of the securing member is formed on the base portion.

11. The electronic device of claim 9, wherein the latch portion of the securing member is arc-shaped.

12. The electronic device of claim 9, wherein an operating tab is formed on the latch portion of the securing member for deforming the latch portion, and a distance is formed between the operating tab and the free end of the latch portion.

13. The electronic device of claim 9, wherein the chassis comprises a rear plate with an outer surface; the tray comprises a bottom wall substantially perpendicular to the rear plate.

14. The electronic device of claim 13, wherein a locking block is formed on the base portion of the securing member, to engage with the securing hole; and the securing hole is defined in the bottom wall of the tray.

* * * * *